United States Patent
Watabe et al.

(10) Patent No.: US 8,593,926 B2
(45) Date of Patent: Nov. 26, 2013

(54) INFORMATION STORAGE DEVICE, INFORMATION RECORDING MEDIUM, AND INFORMATION STORAGE METHOD

(75) Inventors: Kazuo Watabe, Kanagawa-ken (JP); Kazuto Kuroda, Kanagawa-ken (JP); Takashi Usui, Saitama-ken (JP); Hideaki Okano, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/353,474

(22) Filed: Jan. 19, 2012

(65) Prior Publication Data

US 2012/0140606 A1   Jun. 7, 2012

Related U.S. Application Data

(63) Continuation of application No. PCT/JP2009/003538, filed on Jul. 28, 2009.

(51) Int. Cl.
*G11B 7/00* (2006.01)

(52) U.S. Cl.
USPC .......................................... 369/103

(58) Field of Classification Search
USPC .......................................... 369/103
See application file for complete search history.

(56) References Cited

U.S. PATENT DOCUMENTS

| 2006/0146386 | A1 | 7/2006 | Yamatsu et al. |
| 2006/0279824 | A1 | 12/2006 | Riley et al. |
| 2008/0239921 | A1* | 10/2008 | Tatsuta et al. ............ 369/103 |
| 2009/0080318 | A1 | 3/2009 | Tatsuta et al. |

FOREIGN PATENT DOCUMENTS

| JP | 2006-162928 | 6/2006 |
| JP | 2006-331546 | 12/2006 |
| JP | 2009-080906 | 4/2009 |

OTHER PUBLICATIONS

International Search Report for International Patent Application No. PCT/JP2009/003538 mailed on Dec. 1, 2009.
Written Opinion for International Patent Application No. PCT/JP2009/003538.
Japanese Office Action mailed Jul. 17, 2013 for Japanese Patent Application No. 2011-524538, 3 pages.

* cited by examiner

*Primary Examiner* — Thang Tran
(74) *Attorney, Agent, or Firm* — Turocy & Watson, LLP

(57) ABSTRACT

An information storage device includes an information recording medium, at least a single light source that emits laser light, an illuminating unit that illuminates substantially the same position of the information recording medium with two light rays generated from the laser light, in different directions, a light detecting unit that detects reflection light of the two light rays reflected from the information recording medium and outputs a detection signal, an operation unit that calculates position error information of the information recording medium based on the detection signal; and, a driving device that changes the position of the information recording medium based on the position error information.

8 Claims, 9 Drawing Sheets

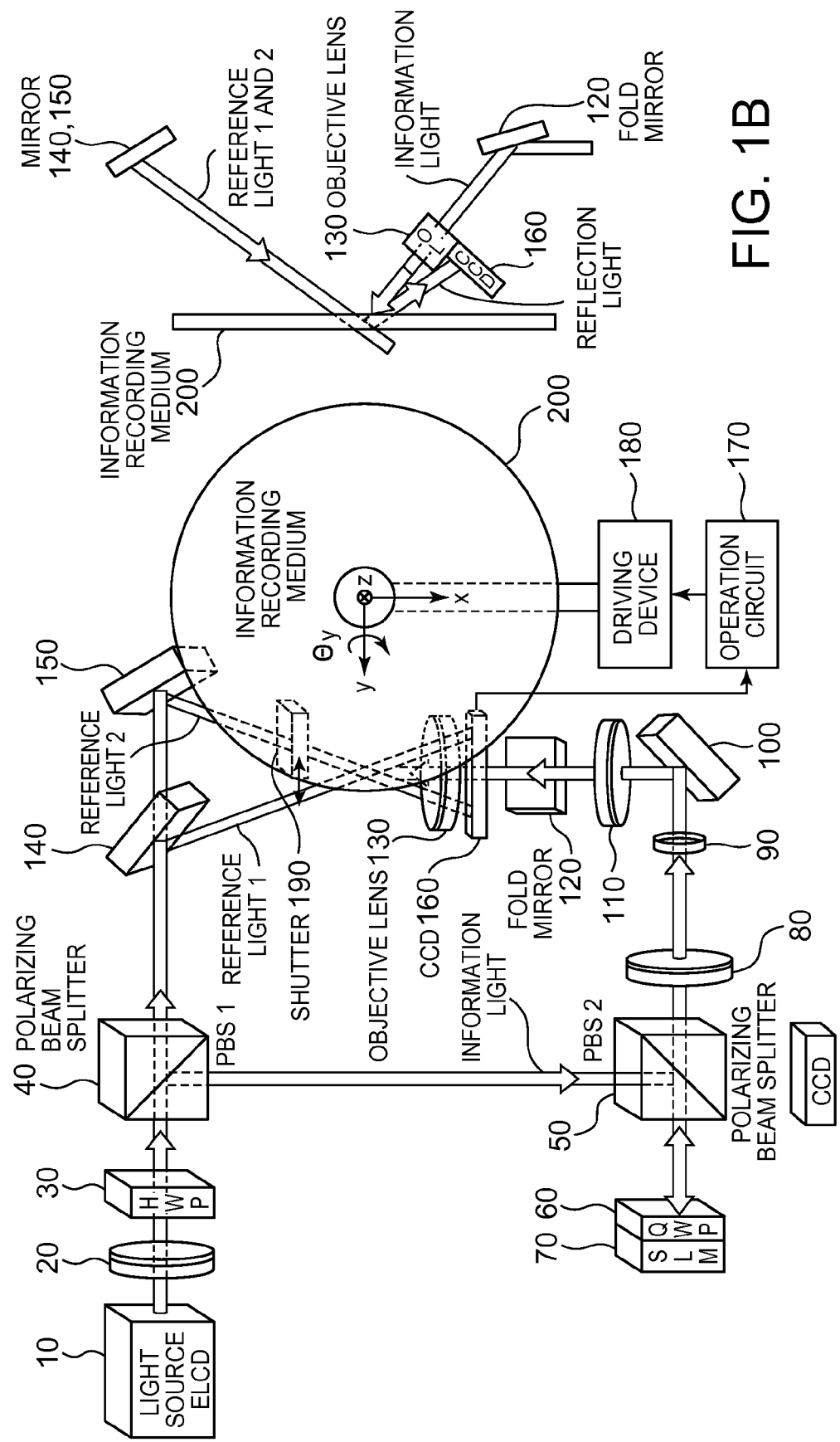

INFORMATION STORAGE DEVICE, INFORMATION RECORDING MEDIUM, AND INFORMATION STORAGE METHOD

CROSS-REFERENCE TO RELATED APPLICATIONS

This application is a continuation application of PCT application Serial No. PCT/JP2009/003538, filed on Jul. 28, 2009, the entire contents of which are incorporated herein by reference.

FIELD

Embodiments described herein generally relate to an information storage device, an information recording medium, and an information storage method.

BACKGROUND

As an information storage device, a holographic storage device is known. Since the holographic storage device records information as a hologram, the holographic storage device can record a large capacity of information and thus attracts attention as a next-generation recording medium.

U.S. Patent Application Laid-Open No. 2006-0279824 discloses an example of holographic storage device. The holographic storage device that is disclosed in U.S. Patent Application Laid-Open No. 2006-0279824 illuminates a holographic storage medium with laser light emitted from a light source, detects reflection light thereof, and detects an angle of the holographic storage medium. In the holographic storage device, a hologram pattern for vibration detection is recorded in advance in the holographic storage medium, interference stripes generated due to the hologram pattern is observed with a diffraction pattern detecting unit, and the vibration of the holographic storage medium is detected.

However, according to the technology for detecting the angle of the holographic storage medium, an angle sensor using general laser light or LED light is only applied to the holographic storage medium. Therefore, error information of plural control axis positions cannot be acquired by the angle sensor disclosed in U.S. Patent Application Laid-Open No. 2006-0279824.

In addition, in regard to the technology for recording the holographic pattern for the vibration detection in advance in the holographic storage medium, three-dimensional position control of the holographic storage medium cannot be performed.

BRIEF DESCRIPTION OF THE DRAWINGS

FIGS. 1A and 1B are diagrams illustrating a configuration that is applied to information recording of an information storage device according to a first embodiment.

DETAILED DESCRIPTION

Figures 2A, 2B:
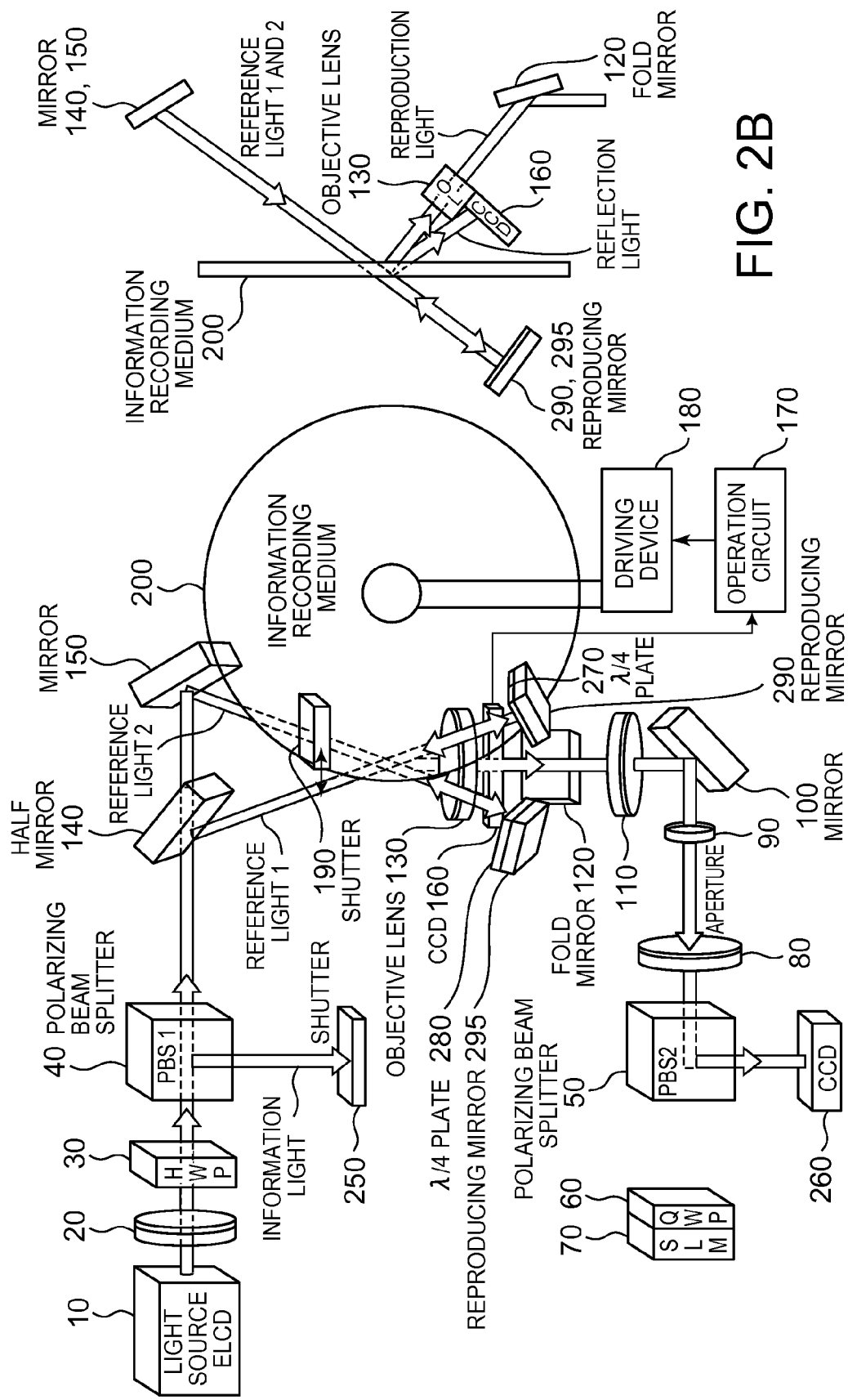
FIGS. 2A and 2B are diagrams illustrating a configuration that is applied to information reproducing of the information storage device according to the first embodiment.

In view of the above circumstances, an aspect of embodiments provides an information storage device. The information storage device includes an information recording medium, at least a single light source that emits laser light, an illuminating unit that illuminates substantially the same positions of the information recording medium with two light rays generated from the laser light, from different directions, a light detecting unit that detects reflection light of the two light rays reflected from the information recording medium and outputs a detection signal, an operation unit that calculates position error information of the information recording medium based on the detection signal, and a driving device that changes the position of the information recording medium based on the position error information.

In view of the above circumstances, another aspect of embodiments provides an information recording medium. The information recording medium includes a first transparent substrate and a second transparent substrate; and a recording medium, interposed between the first transparent substrate and the second transparent substrate, which records information. A servo mark that reflects light rays emitted in two different directions is formed on an interface of the first transparent substrate and the recording medium or an interface of the second transparent substrate and the recording medium. Other aspect of embodiments provides an information storage method comprising an information recording medium and at least a single light source emitting laser light. The information storage method includes illuminating substantially the same positions of the information recording medium with two light rays generated from the laser light, from different directions, by the illuminating unit, detecting reflection light of the two light rays reflected from the information recording medium and outputting a detection signal, by the light detecting unit, calculating position error information of the information recording medium based on the detection signal, by the operation unit, and changing the position of the information recording medium based on the position error information, by the driving device.

According to an aspect of the embodiments, the laser light is irradiated to the same position of the information recording medium from the two different directions and the reflection light thereof is detected so that three-dimensional position information of the information recording medium can be detected. By controlling the position of the information recording medium based on the position information, three-dimensional position control can be performed with high precision.

Hereinafter, an information storage device according to embodiments will be described in detail.

First Embodiment

An information storage device according to a first embodiment will be described. In this embodiment, an example of the case where the invention is applied to a holographic storage device of a two light ray system as an information storage device is described. The invention is not limited to the holographic storage device and is applied to the case where the position and the inclination of an information recording medium need to be corrected.

FIGS. 1A and 1B illustrate a configuration of when information is recorded on the information recording medium of the information storage device. An information recording medium 200 is a holographic storage medium. A light source (ECLD) 10 is a semiconductor laser. The light source 10 illuminates a collimation lens 20 with laser light to record information on the information recording medium 200. The collimation lens 20 converts the laser light into collimation light and emits the collimation light to a polarizing beam splitter (PBS1) 40 through a $\lambda/2$ plate (HWP) 30. The $\lambda/2$ plate 30 can adjust a polarizing direction of the laser light. The polarizing beam splitter 40 splits the laser light into information light and reference light.

The information light from the polarizing beam splitter 40 is incident on a polarizing beam splitter (PBS2) 50. The polarizing beam splitter 50 reflects the information light and makes the information light incident on a spatial light modulator (SLM) 70 through a $\lambda/4$ plate (QWP) 60. The spatial light modulator 70 modulates the information light into page data to be recorded on the information recording medium 200. The modulated information light is incident on an objective lens 130 through the $\lambda/4$ plate 60, the polarizing beam splitter 50, a lens 80, an aperture 90, a mirror 100, a lens 110, and a fold mirror 120. The information light from the $\lambda/4$ plate 60 becomes information light having polarization orthogonal to polarization at the time of being incident on the polarizing beam splitter 50 and transmits the polarizing beam splitter 50. The lens 80 condenses the information light. The aperture 90 restricts a size of passage light near the focus of the condensed information light and controls a spot size of the information light on the information recording medium 200. The lens 110 converts the information light into collimation light. The objective lens 130 focuses on the recording position of the information recording medium 200 and illuminates the information recording medium 200 with the information light.

Meanwhile, the reference light that is transmitted through the polarizing beam splitter 40 is reflected by a half mirror 140 and is irradiated to the same position as the information light of the information recording medium 200 as reference light 1. The reference light that is transmitted through the half mirror 140 is reflected by a mirror 150 and is irradiated to the same position as the information light of the information recording medium 200 as reference light 2. A shutter 190 is provided between the half mirror 140, the mirror 150 and the information recording medium 200.

In this embodiment, a light detector 160 that detects the reference light 1 or the reference light 2 reflected by the information recording medium 200 is provided. The light detector 160 is a CCD image sensor. The light detector 160 transmits image information of an image of reflection light of the reference light 1 or the reference light 2 to an operation circuit 170. The operation circuit 170 calculates position error information of the information recording medium 200 based on the image information. The position error information is transmitted to a driving device 180. The driving device 180 drives the information recording medium 200 based on the position error information and corrects the position.

Next, an operation when information is recorded on the information recording medium 200 will be described.

In FIG. 1A, the laser light that is irradiated from the light source 10 is incident on the collimation lens 20. The light source 10 is an external cavity laser diode that has a violet-blue wavelength band of the wavelength of 405 nm. A beam that is emitted from the collimation lens 20 becomes collimation light, transmits the $\lambda/2$ plate 30, and is incident on the polarizing beam splitter 40. The beam that is incident on the polarizing beam splitter 40 is split into two systems (P polarized light is transmitted and S polarized light is reflected).

The S polarized light that is reflected by the polarizing beam splitter 40 becomes information light that is used when information is recorded on the information recording medium 200. The P polarized light that is transmitted through the polarizing beam splitter 40 becomes reference light that is used when information is recorded on the information recording medium 200. A light amount ratio of the information light and the reference light can be adjusted by a rotation angle of the $\lambda/2$ plate 30.

The information light (light split in a downward direction in the drawings) that is reflected by the polarizing beam splitter 40 is incident on the second polarizing beam splitter 50. The information light that is reflected by the polarizing beam splitter 50 transmits the $\lambda/4$ plate 60 and is incident on the spatial light modulator 70. The spatial light modulator 70 performs modulation corresponding to the page data recorded on the information recording medium 200, with respect to a wave front of the incident information light, and reflects the information light. The reflected information light transmits the $\lambda/4$ plate 60 again, thus the information light has polarization orthogonal to polarization at the time of being incident on the polarizing beam splitter 50, and transmits the polarizing beam splitter 50.

The information light that is transmitted through the polarizing beam splitter 50 is condensed by the lens 80 and is incident on the lens 110 through the aperture 90 disposed near the focus and the reflection mirror 100. The information light is converted into collimation light again by the lens 110. The aperture 90 restricts a spot size of the information light on the information recording medium 200. Then, the information light that is transmitted through the lens 110 is reflected in an obliquely upward direction by the fold mirror 120 with a direction perpendicular to a plane of paper as an upward direction, and is incident on the objective lens 130. The objective lens 130 illuminates the information recording medium 200 with the information light to focus on a recording layer of the information recording medium 200.

Meanwhile, the reference light that is transmitted through the polarizing beam splitter 40 is split into the reference light 2 transmitting the half mirror 140 and the reference light 1 reflected by the half mirror 140. In addition, the reference light 2 that is transmitted through the half mirror 140 is reflected by the mirror 150. The shutter 190 shields either the reference light 1 or the reference light 2. The reference light that is not shielded by the shutter 190 is irradiated to almost the same position as the information light of the information recording medium 200. That is, the reference light 1 and the reference light 2 are irradiated to almost the same positions on the information recording medium 200 focused by the information light, with different angles.

Specifically, when information is recorded on the information recording medium 200, either the reference light 1 or the reference light 2 is always shielded by the shutter 190. The reference light 1 and the information light or the reference light 2 and the information light are irradiated to the information recording medium 200 at the same time. Thereby, a refractive index change based on an interference pattern of the information light and the reference light 1 or an interference pattern of the information light and the reference light 2 is recorded as the page data on the information recording medium 200. The reason why the reference light 1 and the reference light 2 pass through two optical paths and are irradiated to the information recording medium 200 with the different angles is to perform multiplexing recording of the page data at almost the same positions of the information recording medium 200, with the two angles. Alternatively, the information recording medium 200 may be rotated around a y axis in the drawings (θy rotation) and angle multiplexing recoding may be performed. In this way, information is recorded at the predetermined position on the information recording medium 200.

In this embodiment, three-dimensional position and rotation control is performed using the reference light 1 and the reference light 2.

That is, light that is reflected by a part of the information recording medium 200 illuminated with the reference light 1 and the reference light 2 is irradiated to the light detector 160 that is disposed near the objective lens. The light detector 160 transmits image information of an image of reflection light of the reference light 1 and the reference light 2 to the operation circuit 170.

The operation circuit 170 calculates position error information of the information recording medium 200 based on the image information. The position error information that is calculated by the operation circuit 170 is output to the driving device 180. The driving device 180 is physically connected such that the three-dimensional position and rotation control of the information recording medium 200 can be performed. The driving device 180 generates a driving signal from the position error information. The driving device 180 changes the three-dimensional position and the inclination of the information recording medium 200 based on the driving signal and disposes the information recording medium 200 at the predetermined position. A structure where the operation circuit 170 calculates the position error information of the information recording medium 200 based on the image information of the light detector 160 will be described below.

When the position error information of the information recording medium 200 is calculated, the shutter 190 may not shield both the reference light 1 and the reference light 2, that is, the reference light 1 and the reference light 2 may be reflected by the information recording medium 200 at the same time. Similar to when the information is recorded, either the reference light 1 or the reference light 2 may always be shielded by the shutter 190. However, in the case where either the reference light 1 or the reference light 2 is shielded, position information of an image of reflection light of the reference light 1 and the reference light 2 on the light detector 160 is stored in the operation circuit 170 and is used when the position error information is calculated.

FIG. 1B is a side view of a peripheral portion of the information recording medium 200 of FIG. 1A. FIG. 1B illustrates a state where the reference light 1 and the reference light 2 are incident on the information recording medium 200 and the light reflected by the information recording medium 200 is incident on the light detector 160. The reference light that is reflected from the information recording medium 200 passes through the optical path different from the optical path of the information light and is incident to the light detector 160. In FIG. 1B, the reference light 1 and the reference light 2 are displayed in an overlapped state.

FIGS. 2A and 2B illustrate a configuration of when information is reproduced in the information storage device according to the first embodiment. The description of the same elements and operations as those of when the information is recorded in FIGS. 1A and 1B will not be repeated. In FIGS. 2A and 2B, a shutter 250, a light detector 260, a λ/4 plate 270, a reproducing mirror 290, a λ/4 plate 280, and a reproducing mirror 295 that are used for reproduction are provided in the information storage device of FIGS. 1A and 1B.

The shutter 250 shields information light from the polarizing beam splitter 40. The light detector 260 is a CCD image sensor. The light detector 260 detects reflection light of a reproduction signal from the polarizing beam splitter 50. The λ/4 plate 270 and the reproducing mirror 290 are integrally formed and the λ/4 plate 280 and the reproducing mirror 295 are integrally formed. The λ/4 plate 270 and the reproducing mirror 290 as well as the λ/4 plate 280 and the reproducing mirror 295 serve to guide the reference light 1 and 2 to the information recording medium 200.

Next, an operation of when information is reproduced from the information recording medium 200 will be described.

In FIG. 2A, a beam that is incident on the polarizing beam splitter 40 from the light source 10 is split into two systems. In a reproducing operation, since the information light reflected by the polarizing beam splitter 40 is not used for reproduction, the information light is shielded by the shutter 250.

Meanwhile, the reference light that is transmitted through the polarizing beam splitter 40 is split into reference light 1 and reference light 2, similar to the recording operation, and becomes reference light at the time of reproducing the information. The reference light 1 transmits the information recording medium 200, transmits the λ/4 plate 270, is reflected by the reproducing mirror 290, transmits again the λ/4 plate 270 in a reverse direction, and is irradiated to the predetermined position on the information recording medium 200 where information to be read is recorded. Likewise, the reference light 2 transmits the information recording medium 200, transmits the λ/4 plate 280, is reflected by the reproducing mirror 295, transmits again the λ/4 plate 280 in a reverse direction, and is irradiated to almost the same position on the information recording medium 200 where information to be read is recorded.

In this embodiment, the information storage device is a holographic storage device using a so-called phase conjugation reproducing system. The light that is reflected by the reproducing mirror 290 or the reproducing mirror 295 is irradiated to the information recording medium 200. Information light (hereinafter, referred to as reproduction light) based on information that is recorded on the information recording medium 200 is read and is incident on the objective lens 130. The reproduction light that is transmitted through the objective lens 130 is reflected by the fold mirror 120 in a reverse direction of a direction at the time of recording information, and transmits and is reflected by the lens 110, the mirror 100, the aperture 90, and the lens 80 in order. The reproduction light that is transmitted through the lens 80 and becomes collimation light is reflected by the polarizing beam splitter 50 and is input to the light detector 260. The light detector 260 reproduces the page data from the reproduction light read from the information recording medium 200.

When the information is reproduced, either the reference light 1 or the reference light 2 is always shielded by the shutter 190. The reference light 1 or the reference light 2 is irradiated to the position on the information recording medium 200 where the information to be read is recorded. That is, by illumination of the reference light 1, the page data that is recorded by the reference light 1 and the information light is reproduced. By illumination of the reference light 2, the page data that is recorded by the reference light 2 and the information light is reproduced.

FIG. 2B is a side view of a peripheral portion of the information recording medium 200 of the information storage device illustrated in FIG. 2A. FIG. 2B illustrates a state where the reference light incident on the information recording medium 200 and the reproduction light read from the information recording medium 200 are incident on the objective lens 130. The optical paths of the reference light 1 and the reference light 2 that are related to generation of the position error information are the same as those at the time of recording information described in FIGS. 1A and 1B.

According to this embodiment, almost the same position of the information recording medium is illuminated with the laser light from the two different directions and the reflection light thereof is detected so that the three-dimensional position and rotation information of the information recording medium can be detected. By controlling the position of the information recording medium based on the position information, three-dimensional position and rotation control can be performed with high precision.

In the first embodiment, the information recording medium 200 is illuminated with the two light rays from the different directions and the reflection light from any position of the information recording medium 200, for example, the surface, can be detected by the light detector 160. However, in this case, there would be problems, for example, which position of the information recording medium 200 the reflection light is reflected from cannot be specified and only light of a small light amount can be reflected. Therefore, in order to solve these problems, the configuration where servo marks are formed on the information recording medium 200 will be described.

Figure 3:
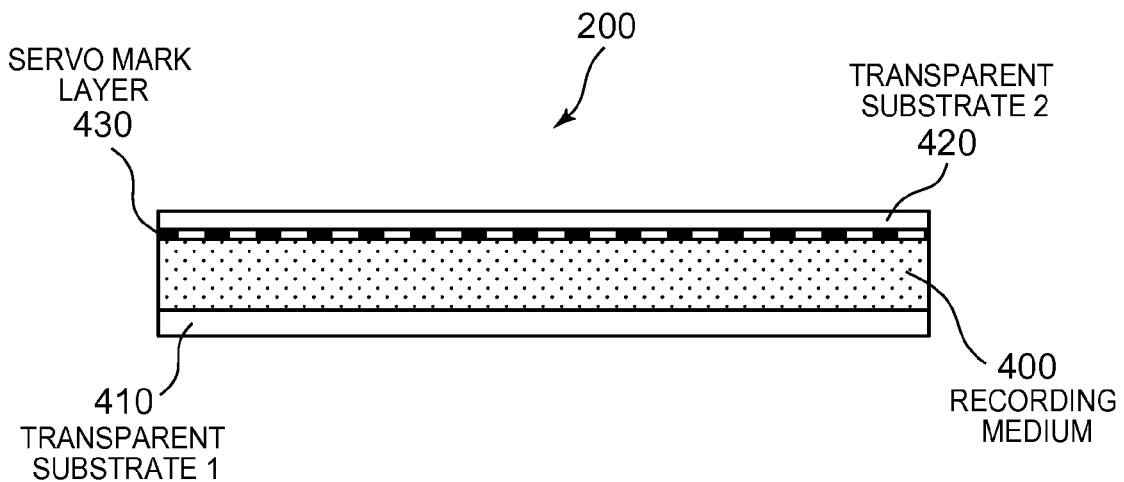
FIG. 3 is a side view of an information recording medium.

FIG. 3 is a side view of the information recording medium 200 where the servo marks are formed. The information recording medium 200 is configured such that a recording medium 400 to record information is interposed by a transparent substrate 410 and a transparent substrate 420 in a vertical direction. The thickness of each portion is not limited in particular. However, the thickness of the transparent substrate 410 and the transparent substrate 420 is 0.5 mm and the thickness of the recording medium 400 is 1.0 mm. On an interface of the recording medium 400 and the transparent substrate 420, a servo mark layer 430 is formed. In the servo mark layer 430, the servo marks that reflect the reference light 1 and 2 are formed. Even when the servo mark layer 430 is formed on the interface of the transparent substrate 410 and the recording medium 400, the same effect can be obtained. A shape of the information recording medium 200 that is viewed from the upper side of FIG. 3 is a circular shape having the diameter of 12 cm, as illustrated in FIGS. 1A to 2B. However, the effect according to the invention is not limited by the shape of the information recording medium and the shape of the information recording medium may be a square shape, a rectangular shape, an elliptical shape, and other polygonal shapes.

Figure 4:
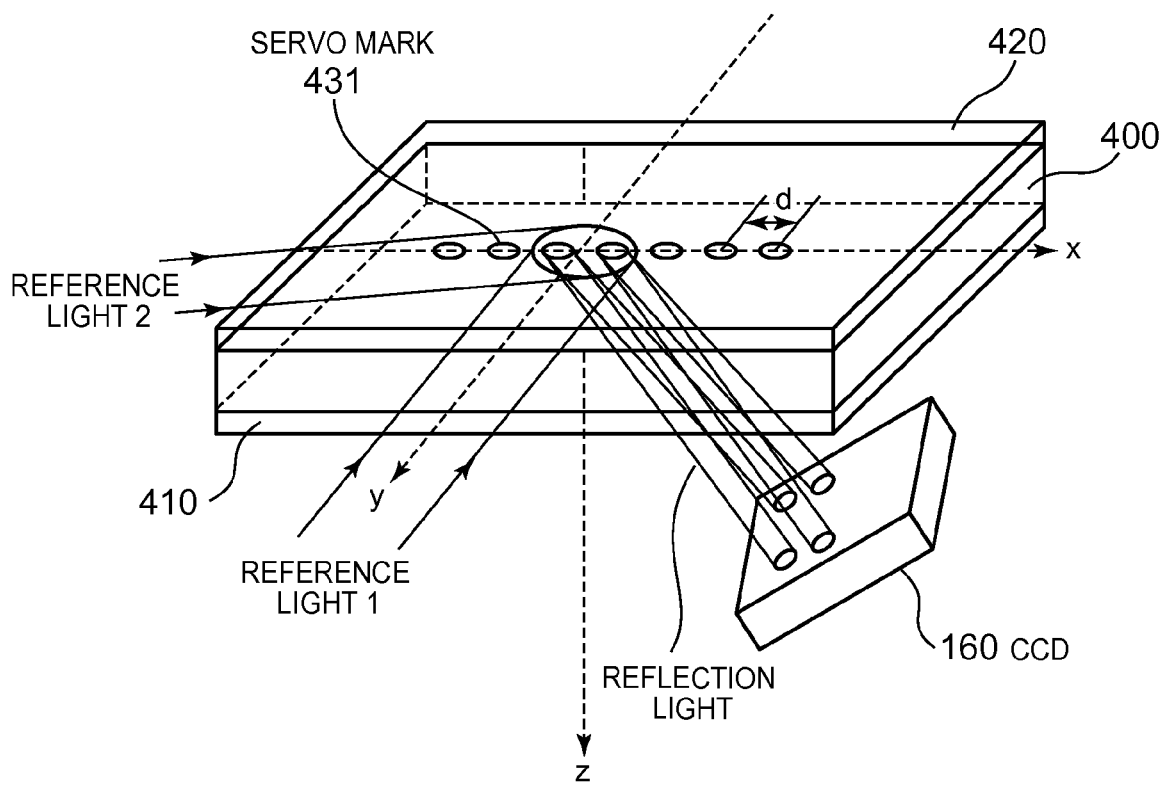
FIG. 4 is a diagram illustrating servo marks of the information recording medium and reflection light.

FIG. 4 is a diagram illustrating a relationship of the servo marks of the information recording medium 200 and the reflection light.

The reference light 1 and the reference light 2 according to the first embodiment are incident from a surface of the lower transparent substrate 410, transmit the recording medium 400, and are irradiated to almost the same positions of the servo mark layer 430. A part of the illuminated light rays is reflected by the servo marks 431 that are formed in the servo mark layer 430. The reflection light sequentially transmits the recording medium 400 and the transparent substrate 410 and is incident on a sensor surface of the light detector 160. In the servo marks 431, minute marks that are made of a thin aluminum film or a thin silver alloy film are recorded at a constant interval. The servo marks 431 reflect the reference light 1 and the reference light 2 with the reflectance of 80% or more.

In an example of FIG. 4, the circular reflection servo marks 431 are recorded at a constant interval d along the x direction. The diameter of the servo mark 431 is 50 μm and the constant interval d is 1.0 mm, for instance. The reference light 1 and the reference light 2 have almost the same section diameters and capture the servo marks 431 in the servo mark layer 430 in the illuminated light rays. For example, when the reference light 1 and the reference light 2 capture the two servo marks 431 and 431 in the illuminated light rays at the same time, reflection light from the servo marks 431 and 431 becomes four reflection light rays that are two reflection light rays from the reference light 1 and two reflection light rays from the reference light 2 and is incident on the sensor surface of the light detector 160.

(Calculation of Three-Dimensional Position Error Information)

Next, how an image of reflection light of the servo marks 431 on the light detector 160 changes and how the three-dimensional position error information from corresponding information is calculated, when the servo marks 431 are disposed on the information recording medium 200 and the servo marks 431 are illuminated with the reference lights 1 and 2 from the two different directions, will specifically be described.

Figure 5:
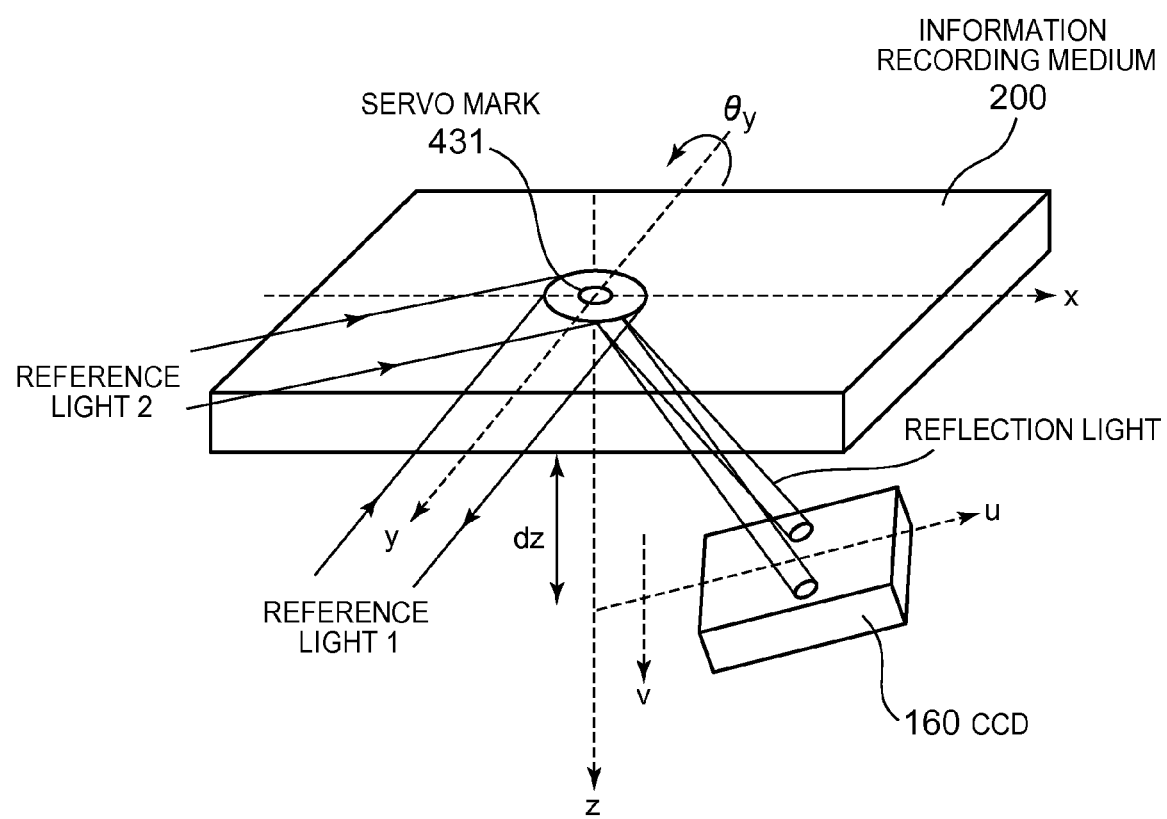
FIG. 5 is a diagram illustrating a position relationship of light irradiated to the information recording medium and a light detector detecting reflection light thereof.

FIG. 5 is a diagram illustrating a position relationship of the servo marks 431 on the information recording medium 200 and the light detector 160 detecting the illuminated reference lights 1 and 2 and reflection light thereof.

The coordinates x, y, and z of the information recording medium 200 are as illustrated in FIG. 5. That is, using the center of the servo mark 431 as an original point, medium extension directions are set to x and y, and a medium thickness direction is set to z. The information recording medium 200 is a holographic storage medium where angular multiplexing recording is performed in a rotation (θy) direction around the y axis. In FIG. 5, a single servo mark 431 that is positioned at the original point is illustrated to simplify the configuration of the drawing. The servo marks 431 of the number that is needed to control the position are disposed at the constant interval d along at least the x-axis direction.

The position error information is used to calculate the deviation of the servo mark 431 from the reference position (original point). That is, the position error information is ultimately used to perform the position control of the information recording medium 200 to approximate the servo mark 431 to the reference position based on the position error information.

In the light detector 160, a plane that is formed by the sensor surface of the light detector 160 is set to an uv plane. The uv plane of the sensor is a plane of when the xy plane of the information recording medium 200 moves in a z-axis direction by the constant distance dz in parallel and rotates by a constant angle αy around the y axis. For example, with respect to rotation around the y axis, a positive direction of the y axis is adopted in a direction where a right screw moves and a rotation direction of the right screw is set to "positive".

In this embodiment, the movement amount of the z-axis direction is set to dz=12 mm and a rotation angle around the y axis is set to αy=10 degrees. In FIG. 5, in order to simplify the configuration of the drawing, the information recording medium 200 is configured by integrating the transparent substrate 410 and the recording medium 400 of FIG. 3 and the thickness thereof is set to 1.5 mm. The transparent substrate 420 is not displayed herein. With respect to incident angles of the reference lights 1 and 2, a rotation angle around the y axis is set to 51.0 degrees and a rotation angle around the z axis is set to −35.8 degrees (reference light 1) and 35.8 degrees (reference light 2).//

Next, an operation process of the three-dimensional position error information and positioning and driving control of the information recording medium by the operation process will be described with reference to FIGS. 6A to 9B.

Each servo mark reflection spot image is illustrated by surrounding a reflection spot image with a circle when the servo mark 431 is positioned at the original point (reference position) of the xyz coordinates and the information recording medium 200 is inclined by 10 degrees around the y axis.

In the operation process of the position error information according to this embodiment, the displacement of the center position of the reflection spot image of the servo mark 431 on the sensor surface of the light detector 160 corresponding to the displacement and the rotation of the information recording medium 200 is detected and the displacement and the rotation of the information recording medium 200 are calculated from the displacements of the plural reflection spot images by the operation.

(Calculation of the Position Error Information of the x Direction)

First, calculation of the position error information of the x direction will be described using FIGS. 6A and 6B.

Figures 6A, 6B:
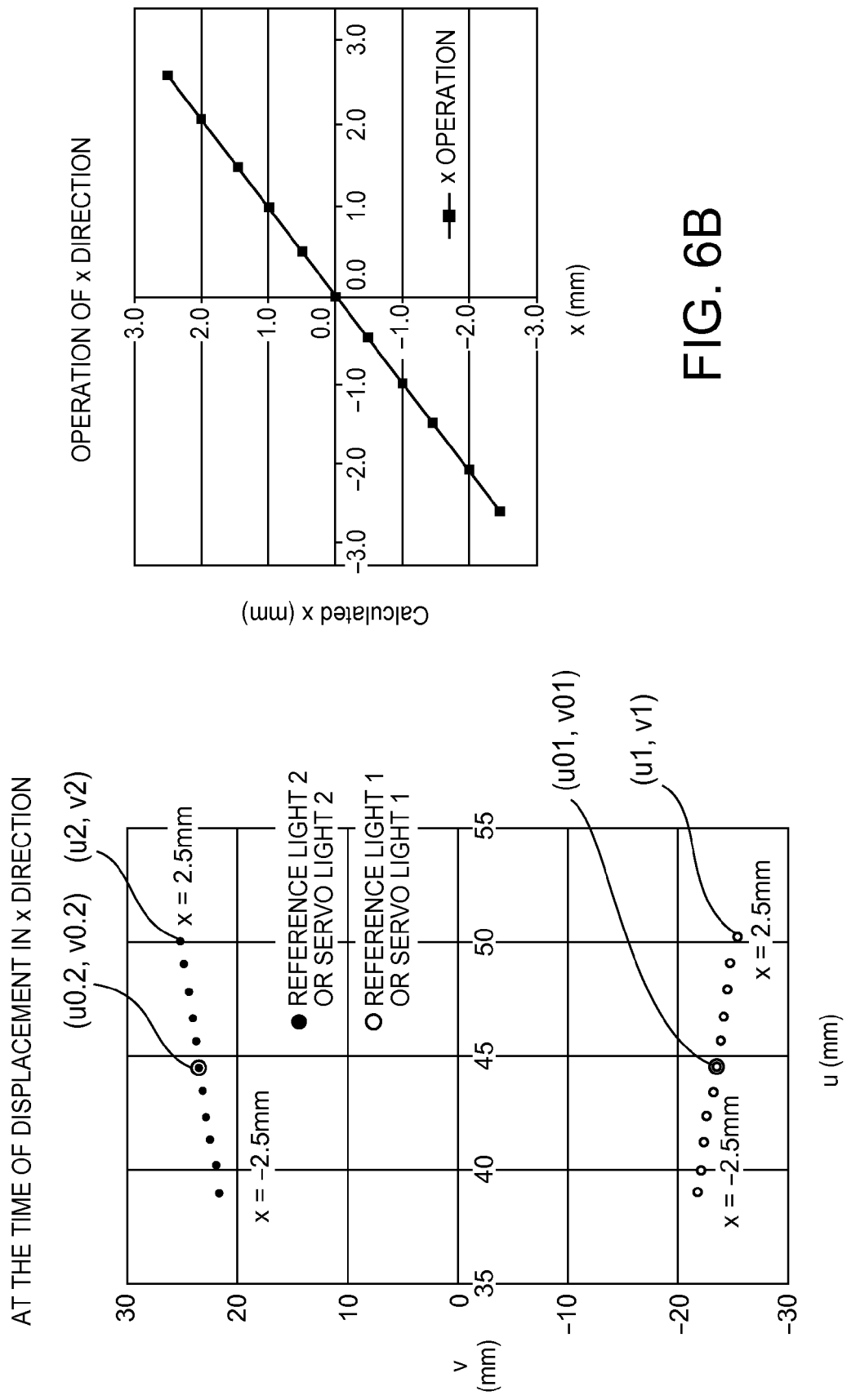
FIGS. 6A and 6B are diagrams illustrating a relationship of a servo mark reflection spot image by displacement of an x direction of two light rays and an operation result of a position error of the x direction and position error information of the x direction.

FIG. 6A illustrates the center position of the servo mark reflection spot image when the information recording medium 200 illustrated in FIG. 5 is displaced in the x direction. FIG. 6B illustrates a relationship of the displacement (horizontal axis) of the x direction of the servo mark and a position error information operation value (vertical axis) of the x direction.

In FIG. 6A, the center position of the servo mark reflection spot image when the servo mark 431 is displaced in a range of ±2.5 mm in the x direction from the reference position is illustrated at an interval of 0.5 mm. FIG. 6A illustrates a result that is obtained by performing a geometric optical simulation of the incident light and the reflection light based on the mechanical conditions such as the thickness and the angle of the information recording medium 200 and the incident conditions of the incident light. This is the same in FIGS. 7A to 9B.

The coordinates of the center position of the servo mark reflection spot image on the sensor surface by the reference light 1 are set to (u1, v1). The coordinates of the center position of the servo mark reflection spot image on the sensor surface by the reference light 2 are set to (u2, v2). The coordinates of the center position of the servo mark reflection spot image on the sensor surface by the reference light 1 at the reference position are set to (uo1, vo1). The coordinates of the center position of the servo mark reflection spot image on the sensor surface by the reference light 2 at the reference position are set to (uo2, vo2). At this time, the displacement x of the x direction of the servo mark 431 can be calculated by an operation of Equation 1: $x=A\{(u1-uo1+u2-uo2)-B(vo1-v1+v2-vo2)\}$.

A and B are a constant. As a result that is obtained after the inventor performs the simulation, it can be confirmed that the operation result of the displacement of the x direction and Equation 1 has a characteristic illustrated in FIG. 6B, by setting values of A=0.47 and B=1.71.

As can be seen from FIG. 6B, the operation result of the position error information of Equation 1 shows that the displacement of the x direction of the information recording medium 200 is reproduced with high precision. Therefore, the servo mark 431 on the information recording medium 200 can be guided to the reference position with high precision by moving the information recording medium 200 in the x direction to become the operation result x=0, based on the operation result of the position error information. That is, the operation result of the position error information that is calculated by performing the operation illustrated in Equation 1 by the operation circuit 170 is supplied to the driving device 180. The driving device 180 controls the movement of the information recording medium 200 to guide the servo mark 431 to the reference position.

(Calculation of the Position Error Information of the y Direction)

Next, calculation of the position error information of the y direction will be described using FIGS. 7A and 7B.

Figure 7B:
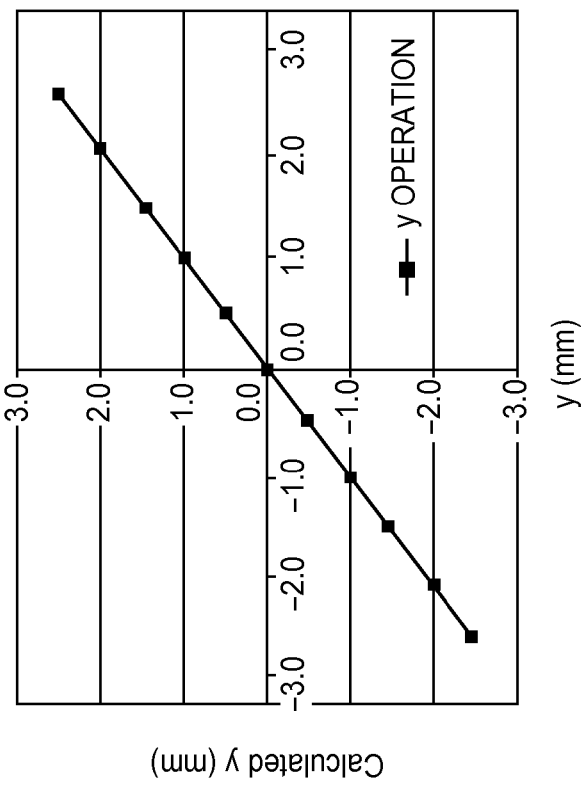
FIGS. 7A and 7B are diagrams illustrating a relationship of the servo mark reflection spot image by displacement of a y direction of two light rays and an operation result of a position error of the y direction and position error information of the y direction.
Figure 7A:
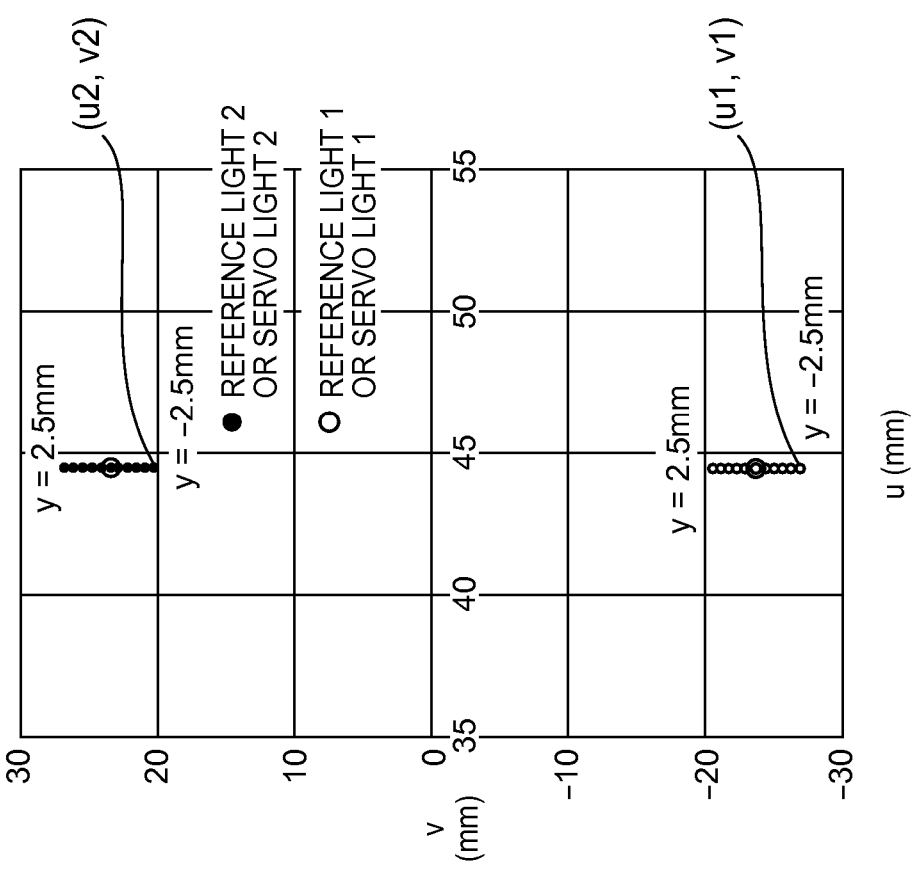

FIG. 7A illustrates the center position of the servo mark reflection spot image when the information recording medium 200 illustrated in FIG. 5 is displaced in the y direction. FIG. 7B illustrates a relationship of the displacement (horizontal axis) of the y direction of the servo mark and a position error information operation value (vertical axis) of the y direction.

In FIG. 7A, the center position of the servo mark reflection spot image when the servo mark 431 is displaced in a range of ±2.5 mm in the y direction from the reference position is illustrated at an interval of 0.5 mm. The coordinates of the center position of the servo mark reflection spot image on the sensor surface by the reference light 1 are set to (u1, v1). The coordinates of the center position of the servo mark reflection spot image on the sensor surface by the reference light 2 are set to (u2, v2). At this time, the displacement of the y direction of the servo mark 431 can be calculated by an operation of Equation 2: $y=C(v1+v2)$.

C is a constant. Likewise, as a result that is obtained by performing the simulation described above, it can be confirmed that the operation result of the displacement of the y direction and Equation 2 has a characteristic illustrated in FIG. 7B, by setting a value of C=0.50.

As can be seen from FIG. 7B, the operation result of the position error information of Equation 2 shows that the displacement of the y direction of the information recording medium 200 is reproduced with high precision. Therefore, the servo mark 431 on the information recording medium 200 can be guided to the reference position with high precision by moving the information recording medium 200 in the y direction to become the operation result y=0, based on the operation result of the position error information. Likewise, the operation result of the position error information that is calculated by performing the operation illustrated in Equation 2 by the operation circuit 170 is supplied to the driving device 180. The driving device 180 controls the movement of the information recording medium 200 to guide the servo mark 431 to the reference position.

(Calculation of the Position Error Information of the z Direction)

Next, calculation of the position error information of the z direction will be described using FIGS. 8A and 8B.

Figure 8B:
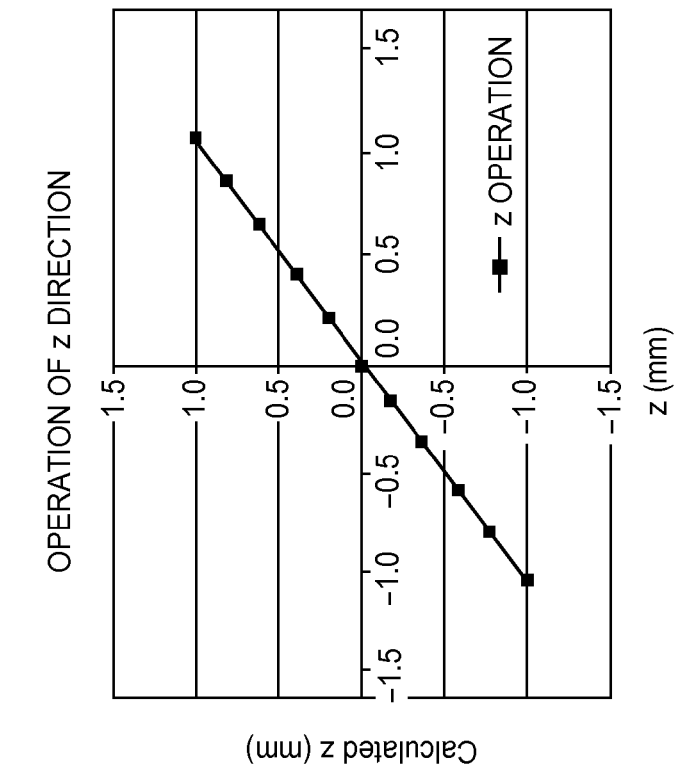
FIGS. 8A and 8B are diagrams illustrating a relationship of the servo mark reflection spot image by displacement of a z direction of two light rays and an operation result of a position error of the z direction and position error information of the z direction.
Figure 8A:
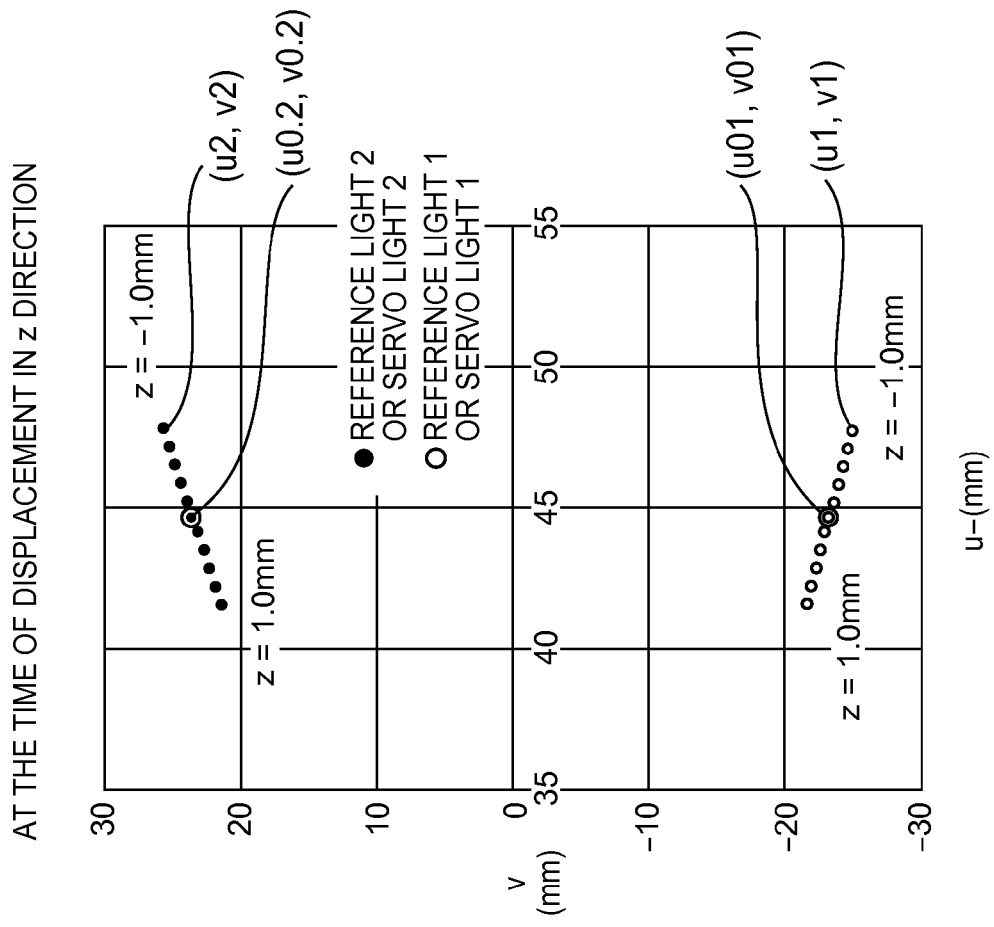

FIG. 8A illustrates the center position of the servo mark reflection spot image when the information recording medium 200 illustrated in FIG. 5 is displaced in the z direction. FIG. 8B illustrates a relationship of the displacement (horizontal axis) of the z direction of the servo mark and a position error information operation value (vertical axis) of the z direction.

In FIG. 8A, the center position of the servo mark reflection spot image when the servo mark 431 is displaced in a range of ±1.0 mm in the z direction from the reference position is illustrated at an interval of 0.2 mm. The coordinates of the center position of the servo mark reflection spot image on the sensor surface by the reference light 1 are set to (u1, v1). The coordinates of the center position of the servo mark reflection spot image on the sensor surface by the reference light 2 are set to (u2, v2). The coordinates of the center position of the servo mark reflection spot image on the sensor surface by the reference light 1 at the reference position are set to (uo1, vo1). The coordinates of the center position of the servo mark reflection spot image on the sensor surface by the reference light 2 at the reference position are set to (uo2, vo2). At this time, the displacement of the z direction of the servo mark 431 can be calculated by an operation of Equation 3: $z=D\{(u1-uo1+u2-uo2)-E(vo1-v1+v2-vo2)\}$.

D and E are a constant. Likewise, as a result that is obtained by performing the simulation described above, it can be confirmed that the operation result of the displacement of the z direction and Equation 3 has a characteristic illustrated in FIG. 8B, by setting values of D=0.84 and E=2.03.

As can be seen from FIG. 8B, the operation result of the position error information of Equation 3 shows that the displacement of the z direction of the information recording medium 200 is reproduced with high precision. Therefore, the servo mark 431 on the information recording medium 200 can be guided to the reference position with high precision by moving the information recording medium 200 in the z direction to become the operation result z=0 based on the operation result of the position error information. Likewise, the operation result of the position error information that is calculated by performing the operation illustrated in Equation 3 by the operation circuit 170 is supplied to the driving device 180. The driving device 180 controls the movement of the information recording medium 200 to guide the servo mark 431 to the reference position.

(Calculation of the Position Error Information of the θy Direction)

Next, calculation of the position error information of the θy direction will be described using FIGS. 9A and 9B.

Figure 9B:
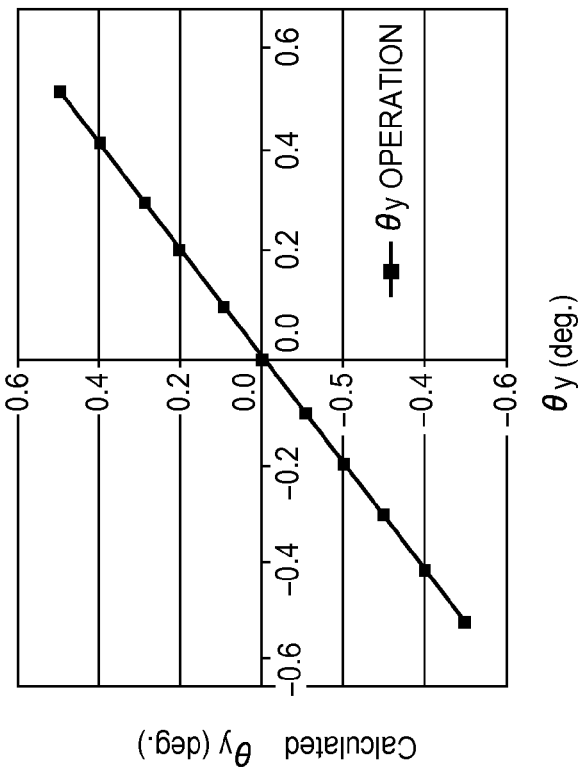
FIGS. 9A and 9B are diagrams illustrating a relationship of the servo mark reflection spot image by rotation of a $\theta y$ direction of two light rays and an operation result of a position error of the $\theta y$ direction and position error information of the $\theta y$ direction.
Figure 9A:
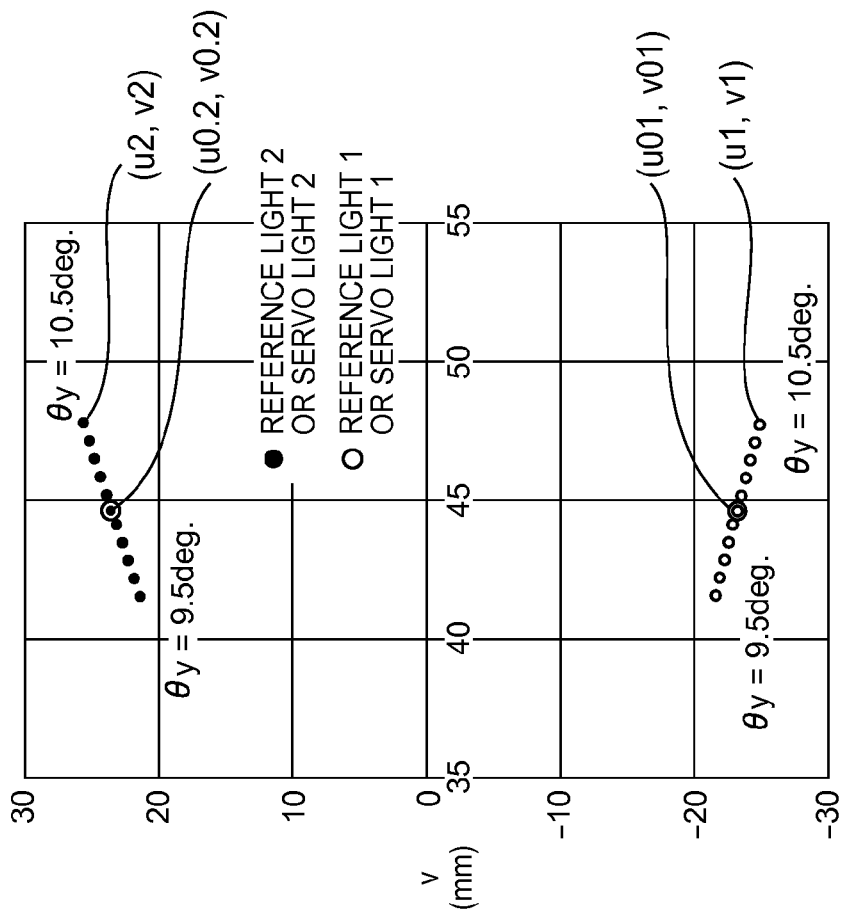

FIG. 9A illustrates the center position of the servo mark reflection spot image when the information recording medium 200 illustrated in FIG. 5 is rotated in the θy direction. FIG. 9B illustrates a relationship of the displacement (horizontal axis) of the θy direction of the servo mark and a position error information operation value (vertical axis) of the θy direction.

In FIG. 9A, the center position of the servo mark reflection spot image when the servo mark 431 is rotated in a range of ±0.5 degree in the θy direction from the reference position is illustrated at an interval of 0.1 degree. The coordinates of the center position of the servo mark reflection spot image on the sensor surface by the reference light 1 are set to (u1, v1). The coordinates of the center position of the servo mark reflection spot image on the sensor surface by the reference light 2 are set to (u2, v2). The coordinates of the center position of the servo mark reflection spot image on the sensor surface by the reference light 1 at the reference position are set to (uo1, vo1). The coordinates of the center position of the servo mark reflection spot image on the sensor surface by the reference light 2 at the reference position are set to (uo2, vo2). At this time, the rotation angle θy of θy direction of the servo mark 431 can be calculated by an operation of Equation 4: $θy=F\{(u1-uo1+u2-uo2)-G(vo1-v1+v2-vo2)\}$.

F and G are a constant. Likewise, as a result that is obtained by performing the simulation described above, it can be confirmed that the operation result of the displacement of the θy direction and Equation 4 has a characteristic illustrated in FIG. 9B, by setting values of F=0.48 and G=1.71.

As can be seen from FIG. 9B, the operation result of the position error information of Equation 4 shows that the rotation of the θy direction of the information recording medium 200 is reproduced with high precision. Therefore, the servo mark 431 on the information recording medium 200 can be guided to the reference position with high precision by rotating the information recording medium 200 in the θy direction to become the operation result θy=0 based on the operation result of the position error information. Likewise, the operation result of the position error information that is calculated by performing the operation illustrated in Equation 4 by the operation circuit 170 is supplied to the driving device 180. The driving device 180 controls the movement of the information recording medium 200 to guide the servo mark 431 to the reference position.

In the examples of the calculation of the position error information, the examples where the reflection spot image by a single servo mark 431 on the information recording medium 200 is used in the calculation of the position error information to simplify the description are described. However, the reflection spot image by the plural servo mark 431 may be used in the calculation of the position error information. For example, as illustrated in FIG. 4, by detecting the center positions of the four reflection spot images by the two servo marks 431 and using the center positions in the calculation of the position error information, the operation becomes complicated. However, the position information can be calculated with more precision.

Second Embodiment

Figure 10:
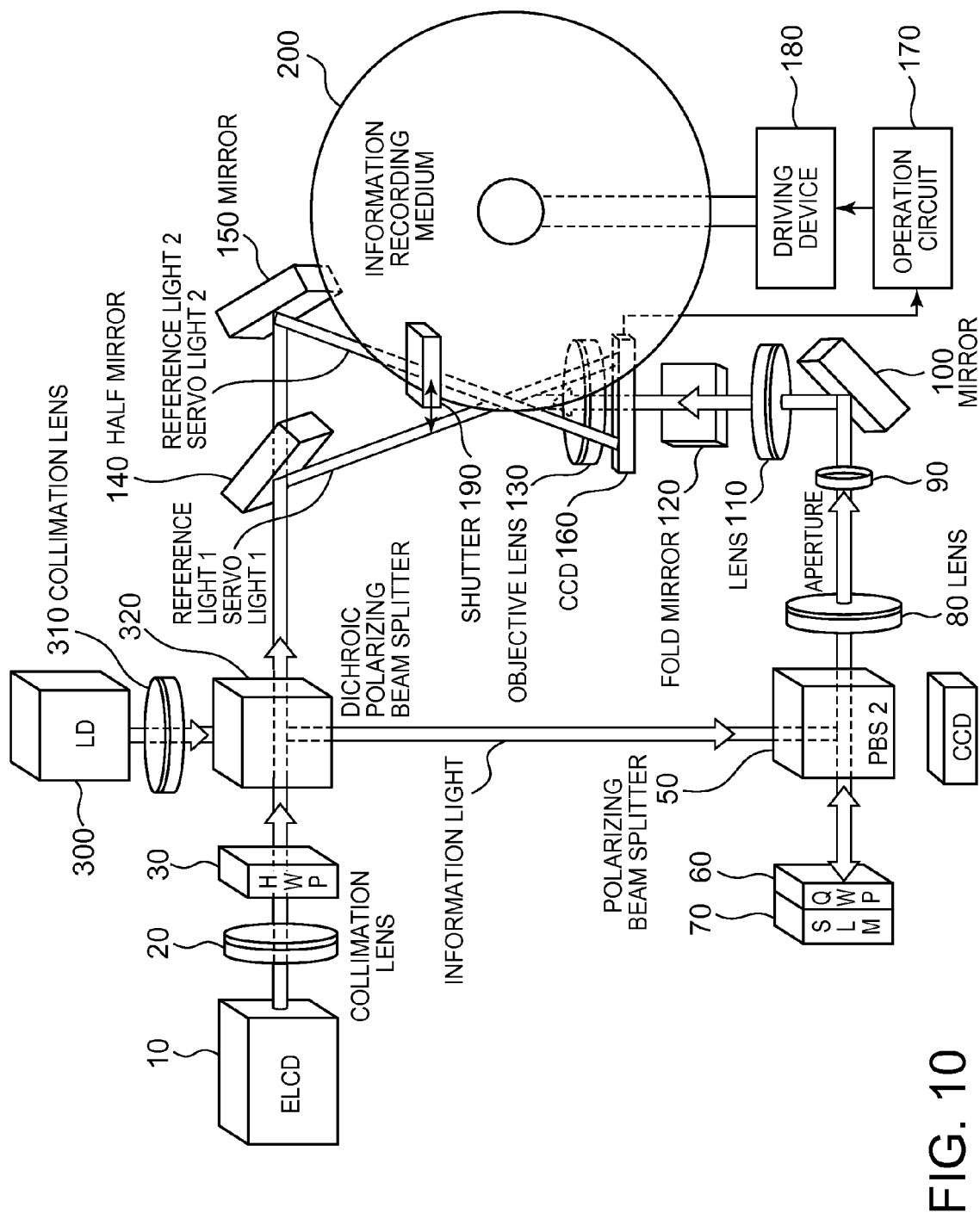
FIG. 10 is a diagram illustrating a configuration that is applied to information recording of an information storage device according to a second embodiment.

FIG. 10 illustrates the configuration of an information storage device according to a second embodiment. In this embodiment, servo dedicated light is used to generate position error information of an information recording medium. The servo dedicated light is a beam that has the wavelength different from the wavelength of the reference light used to record and reproduce the information.

In FIG. 10, the same circuits and devices as those of the information storage device according to the first embodiment are denoted by the same referenced numerals and the description thereof will be omitted. In FIG. 10, a light source (LD) 300 that irradiates the servo dedicated light and a collimation lens 310 that is illuminated with the laser light from the light source (LD) 300 are additionally provided. Instead of a polarizing beam splitter 40, a dichroic polarizing beam splitter (PBS) 320 is used.

FIG. 10 illustrates a state of when information is recorded on the information recording medium 200. Paths of light beams, elements, an operation, and a driving operation that are related to generation of the position error information at the time of reproducing information from the information recording medium 200 are the same as those at the time of recording information.

In FIG. 10, laser light that is emitted from a light source (ECLD) 10 and has the center wavelength of 405 nm is incident on the dichroic polarizing beam splitter 320 through a collimation lens 20 and a λ/2 plate 30. Meanwhile, laser light (servo light) that is emitted from the light source 300 having the wavelength different from the wavelength of the light source 10 transmits the collimation lens 310, becomes collimation light, and is incident on the dichroic polarizing beam splitter 320. In this case, the light source 300 emits light that has the wavelength belonging to a red wavelength band of 650 nm, for instance.

A light splitting surface (inclined surface) of an inner portion of the dichroic polarizing beam splitter 320 always reflects light having the wavelength band of 650 nm from the light source 300. The dichroic polarizing beam splitter 320 has a characteristic of transmitting P polarized light and reflecting S polarized light among the laser lights having the wavelength band of 405 nm from the light source 10. Thereby, the servo light from the light source 300 is reflected by the dichroic polarizing beam splitter 320 and is emitted to a half mirror 140. The laser light that is emitted from the light source 10 is split into two systems by the dichroic polarizing beam splitter 320 (the P polarized light is transmitted and the S polarized light is reflected). In addition, the S polarized light becomes information light and the P polarized light becomes reference light 1 and 2. Since paths of the information light and the reference lights 1 and 2 are the same as those in the first embodiment, the description thereof will be omitted.

Meanwhile, the servo light from the light source 300 is split into servo light 1 reflected by the half mirror 140 and servo light 2 transmitting the half mirror 140. The servo light 1 passes through the same path as that of the reference light 1. The servo light 2 passes through the same path as that of the reference light 2. Therefore, the servo lights 1 and 2 are irradiated to almost the same positions focused by the information light on the information recording medium 200, with different angles, respectively. Thereby, information is recorded on the information recording medium 200.

Next, three-dimensional position and rotation control according to this embodiment will be described. In order to perform the three-dimensional position and rotation control, at least some portions of the servo lights 1 and 2 are reflected by the information recording medium 200 and are detected by a light detector 160 disposed near an objective lens 130. The light detector 160 is a CCD sensor.

The light detector 160 transmits image information of an image of reflection light of the servo light 1 or the servo light 2 to an operation circuit 170. The operation circuit 170 calculates position error information of the information recording medium based on the image information and outputs the position error information to a driving device 180. The driving device 180 is physically connected to the information recording medium 200 such that the three-dimensional position and rotation control of the information recording medium 200 can be performed. Therefore, the driving device 180 changes the three-dimensional position and the inclination of the information recording medium 200 based on a driving signal according to the position error information and disposes the information recording medium 200 at the desired position.

When the position error information of the information recording medium 200 is calculated, the servo lights 1 and 2 may be reflected by the information recording medium 200 at the same time without shielding the servo light 1 or 2 by a shutter 190. Alternatively, either the servo light 1 or the servo light 2 may always be shielded by the shutter 190. However, when either the servo light 1 or the servo light 2 is shielded by the shutter 190, position information of an image of the reflection light by the servo light 1 and the servo light 2 is detected by the light detector 160 and is stored in an internal memory of the operation circuit 170. In addition, the stored position information is used when the position error information is calculated.

The shutter 190 may be formed of a material that transmits the wavelengths of the servo lights 1 and 2 and reflects or absorbs the wavelengths of the reference light 1 and the reference light 2. In this case, the servo light 1 and the servo light 2 are always irradiated to the information recording medium 200 at the same time regardless of whether the servo light is shielded by the shutter 190 and the position information of the image of the reflection light on the light detector 160 does not need to be specially stored in the internal memory of the operation circuit 170.

As described in this embodiment, by using the light beam having the wavelength different from the wavelength used in recording and reproducing as the servo light, wasteful exposure with respect to the information recording medium 200 by the servo light can be avoided. In this case, the wasteful exposure means that the medium reacts by light illumination not contributing to recording of information on the information recording medium 200 and a recording dynamic range of the information recording medium 200 is consumed.

Since the configuration of the information recording medium 200 according to the second embodiment is the same as the configuration illustrated in FIG. 3, the description thereof will not be repeated. However, in a servo mark layer 430 of FIG. 3, servo marks 431 that reflect the servo lights 1 and 2 are formed.

A relationship of the servo marks and the reflection light according to the second embodiment is as illustrated in FIGS. 4 and 5. In this case, the reference light 1 illustrated in FIGS. 4 and 5 is replaced by the servo light 1. The reference light 2 of FIG. 4 is replaced by the servo light 2. In the second embodiment, in FIG. 4, the servo light 1 and the servo light 2 are incident from the surface of a lower transparent substrate 410, transmit a recording medium 400, and are irradiated to almost the same positions of the servo mark layer 430. In addition, a part of the illuminated light rays is reflected by the servo marks 431 formed in the servo mark layer 430. The reflection light sequentially transmits the recording medium 400 and the transparent substrate 410 and is incident on the sensor surface of the light detector 160.

In the second embodiment, the servo mark 431 is provided with a dielectric reflection film that transmits a violet-blue wavelength band and reflects a red wavelength band. Thereby, the servo mark 431 reflects the servo light 1 and the servo light 2 with, for example, the reflectance of 80% or more and transmits the reference light 1 and the reference light 2 with, for example, the transmittance of 95% or more. That is, by forming the servo marks 431 that reflect only the servo light and transmit the reference light, the servo marks can be disposed at any position without affecting the information reproduction. The servo marks 431 may be configured to reflect both the violet-blue wavelength band and the red wavelength band. In this case, information is not recorded immediately below the servo marks so that an influence given to the information reproduction can be avoided.

The calculation of the three-dimensional error information according to the second embodiment can be performed using FIGS. 6A to 9B without making any changes.

(Calculation of the Position Error Information of the x Direction)

In FIGS. 6A and 6B, the coordinates of the center position of the servo mark reflection spot image on the sensor surface by the servo light 1 are set to (u1, v1). The coordinates of the center position of the servo mark reflection spot image on the sensor surface by the servo light 2 are set to (u2, v2). The coordinates of the center position of the servo mark reflection spot image on the sensor surface by the servo light 1 at the reference position are set to (uo1, vo1). The coordinates of the center position of the servo mark reflection spot image on the sensor surface by the servo light 2 at the reference position are set to (uo2, vo2). At this time, the displacement x of the x direction of the servo mark 431 can be calculated using Equation 1.

Therefore, the servo mark 431 on the information recording medium 200 can be guided to the reference position with high precision by moving the information recording medium 200 in the x direction to become the operation result x=0, based on the operation result of the position error information.

(Calculation of the Position Error Information of the y Direction)

In FIGS. 7A and 7B, the coordinates of the center position of the servo mark reflection spot image on the sensor surface by the servo light 1 are set to (u1, v1). The coordinates of the center position of the servo mark reflection spot image on the sensor surface by the servo light 2 are set to (u2, v2). At this time, the displacement of the y direction of the servo mark 431 can be calculated using Equation 2.

Therefore, the servo mark 431 on the information recording medium 200 can be guided to the reference position with high precision by moving the information recording medium 200 in the y direction to become the operation result y=0, based on the operation result of the position error information.

(Calculation of the Position Error Information of the z Direction)

In FIGS. 8A and 8B, the coordinates of the center position of the servo mark reflection spot image on the sensor surface by the servo light 1 are set to (u1, v1). The coordinates of the center position of the servo mark reflection spot image on the sensor surface by the servo light 2 are set to (u2, v2). The coordinates of the center position of the servo mark reflection spot image on the sensor surface by the servo light 1 at the reference position are set to (uo1, vo1). The coordinates of the center position of the servo mark reflection spot image on the sensor surface by the servo light 2 at the reference position are set to (uo2, vo2). At this time, the displacement of the z direction of the servo mark 431 can be calculated using Equation 3.

Therefore, the servo mark 431 on the information recording medium 200 can be guided to the reference position with high precision by moving the information recording medium 200 in the z direction to become the operation result z=0 based on the operation result of the position error information.

(Calculation of the Position Error Information of the $\theta y$ Direction)

In FIGS. 9A and 9B, the coordinates of the center position of the servo mark reflection spot image on the sensor surface by the servo light 1 are set to (u1, v1). The coordinates of the center position of the servo mark reflection spot image on the sensor surface by the servo light 2 are set to (u2, v2). The coordinates of the center position of the servo mark reflection spot image on the sensor surface by the servo light 1 at the reference position are set to (uo1, vo1). The coordinates of the center position of the servo mark reflection spot image on the sensor surface by the servo light 2 at the reference position are set to (uo2, vo2). At this time, a rotation angle $\theta y$ of the $\theta y$ direction of the servo mark 431 can be calculated by Equation 4.

Therefore, the servo mark 431 on the information recording medium 200 can be guided to the reference position with high precision by rotating the information recording medium 200 in the $\theta y$ direction to become the operation result $\theta y$=0 based on the operation result of the position error information.

According to the first and second embodiments, the laser light is irradiated to almost the same positions of the information recording medium from the two different directions and the reflection light is detected so that the three-dimensional position information of the information recording medium can be detected. By performing the position control of the information recording medium based on the position information, the three-dimensional position control can be performed with high precision.

As described in the second embodiment, by using the light beam having the wavelength different from the wavelength used in recording and reproducing as the servo light, the wasteful exposure with respect to the information recording medium by the servo light can be avoided. By forming the servo marks reflecting only the servo light and transmitting the reference light on the information recording medium, the servo marks can be disposed at any position without affecting the information reproduction.

In the invention, designs of the two embodiments may be appropriately changed in a range that falls within the scope and spirit of the invention and the embodiments may be appropriately combined if necessary.

While certain embodiments have been described, these embodiments have been presented by way of example only, and are not intended to limit the scope of the inventions. Indeed, the novel methods and systems described herein may be embodied in a variety of the other forms; furthermore, various omissions, substitutions and changes in the form the methods and systems described herein may be made without departing from the spirit of the inventions. The accompanying claims and their equivalents are intended to cover such forms or modifications as would call within the scope and spirit of the inventions.

What is claimed is:

1. An information storage device comprising:
    an information recording medium;
    at least a single light source that emits laser light;
    an illuminating unit that illuminates substantially the same position of the information recording medium with two light rays generated from the laser light, in different directions;
    a servo mark that reflects the two light rays is formed on the information recording medium;
    an image sensor unit that detects reflection light of the two light rays reflected from the servo mark and outputs an image signal;
    an operation unit that calculates position error information of the information recording medium based on a pair of the coordinate information of a center position of servo mark reflection spot images from the image signal, wherein the pair of the coordinate information that the information recording medium is located at a reference position and at a current position are used to calculate the position information; and a driving device that changes the position of the information recording medium based on the position error information.

2. The information storage device according to claim 1, wherein the information recording medium is a holographic storage medium, and
the two light rays are two reference lights for a recording or a reproduction with respect to the holographic storage medium.

3. The information storage device according to claim 1, wherein the information recording medium is a holographic storage medium,
the light source includes a first light source that is used when information is recorded and reproduced with respect to the holographic storage medium and a second light source that has a wavelength different from that of the first light source, and laser light emitted from the second light source traces the substantial same optical path as reference light of the first light source and the two light rays of different directions are generated.

4. The information storage device according to claim 1, wherein the servo mark is recorded along a shift multiplexing direction of the information recoding medium.

5. The information storage device according to claim 1, wherein the servo mark is formed at a constant interval in a shift multiplexing direction of the information recording medium.

6. An information storage method having an information recording medium and a single light source that emits laser light, the information storage method comprising:
illuminating the substantial same position of the information recording medium with two light rays generated from the laser light, in different directions, by an illuminating unit;
detecting reflection light of the two light rays reflected from a servo mark on the information recording medium and outputting an image signal, by an image sensor unit;
calculating position error information of the information recording medium based on a pair of the coordinate information of a center position of servo mark reflection spot images from the image signal, by an operation unit, wherein the pair of the coordinate information that the information recording medium is located at a reference position and at a current position are used to calculate the position information; and
changing the position of the information recording medium based on the position error information, by a driving device.

7. The information storage method according to claim 6, wherein the information recording medium is a holographic storage medium, and
information is recorded and reproduced with respect to the holographic storage medium using the two light rays.

8. The information storage method according to claim 6, wherein the information recording medium is a holographic storage medium,
the light source includes a first light source that is used when information is recorded and reproduced with respect to the holographic storage medium and a second light source that has a wavelength different from that of the first light source, and
laser light emitted from the second light source traces the substantial same optical path as reference light of the first light source and the two light rays of different directions are generated.

* * * * *